Oct. 28, 1952     J. G. SPICKLER     2,615,424
CATTLE FEED CONVEYING AND DISPENSING APPARATUS
Filed Nov. 7, 1946     6 Sheets-Sheet 1

Inventor
Joseph G. Spickler
Atty

Oct. 28, 1952          J. G. SPICKLER          2,615,424

CATTLE FEED CONVEYING AND DISPENSING APPARATUS

Filed Nov. 7, 1946          6 Sheets—Sheet 5

Oct. 28, 1952 — J. G. SPICKLER — 2,615,424
CATTLE FEED CONVEYING AND DISPENSING APPARATUS
Filed Nov. 7, 1946 — 6 Sheets—Sheet 6

Fig. 8

Inventor
Joseph G. Spickler

Patented Oct. 28, 1952

2,615,424

UNITED STATES PATENT OFFICE 2,615,424

CATTLE FEED CONVEYING AND DISPENSING APPARATUS

Joseph G. Spickler, Rockford, Ill., assignor of four-fifths to Taylor E. Decker, Rockford, Ill.

Application November 7, 1946, Serial No. 708,228

25 Claims. (Cl. 119—51)

This invention relates to cattle feed conveying and dispensing apparatus.

The hauling of ensilage in buckets from the silo to the numerous stalls in a barn is generally regarded as one of the most tedious and monotonous chores that a farmer is called upon to perform, especially at the end of a hard day's work. I am aware that there have been some efforts to find a solution to this problem by specially designing and arranging the barn or barns relative to the silo, but generally this reduced the labor very little in relation to the large cash outlay and offered no relief at all for farms with existing barns, unless expensive remodeling was undertaken. A few conveyors were suggested but they were makeshifts and not of a practical design, some of these still calling for manual labor in their operation. It is, therefore, the principal object of my invention to provide a cattle feed conveying and dispensing apparatus that is power operable and semi-automatic in operation, requiring only the manual operation of a push button to start it.

A salient feature of my conveying and dispensing apparatus is the provision of a plurality of conveyor buckets on an endless conveyor belt or chain operating lengthwise of an aisle between two rows of stalls, the chain being so supported and arranged relative to a supply platform that the buckets will be automatically filled by scooping the ensilage or other feed from the platform, the buckets being hinged to carriers so as to permit dumping the feed automatically when the buckets arrive at their destinations, and the carriers being swivelled on supports on the chain and arranged to be automatically turned to the right or left hand row of stalls after filling and before dumping. The control mechanism is preferably substantially entirely electrical so that the operation of one button sets the apparatus into operation for feeding the cattle in one row of stalls and, when that is completed, the apparatus stops automatically. There remains only the pressing of another button to set the apparatus into operation again to feed the cattle in the other row of stalls. Buckets being individual to stalls, it is obviously possible to vary the feeding according to the needs of the cattle, as by variations in the sizes of buckets or by using one size of buckets and inserting filler blocks of different sizes therein to alter the capacity of the buckets as desired.

Another important feature of my conveying and dispensing apparatus is the provision of electrically operated means for releasing the buckets in dumping the feed into the mangers. The buckets are spring-pressed toward the dumping position and latched in retracted position for picking up and conveying the feed, the latch means being operable by electrical solenoids when the conveyor reaches a predetermined position and stops. The buckets are mechanically returned automatically to the latched position in the travel of the conveyor as the buckets move from the upper flight to the lower flight.

In the accompanying drawings.

Similar reference numerals are applied to corresponding parts throughout the views.

Figure 1:
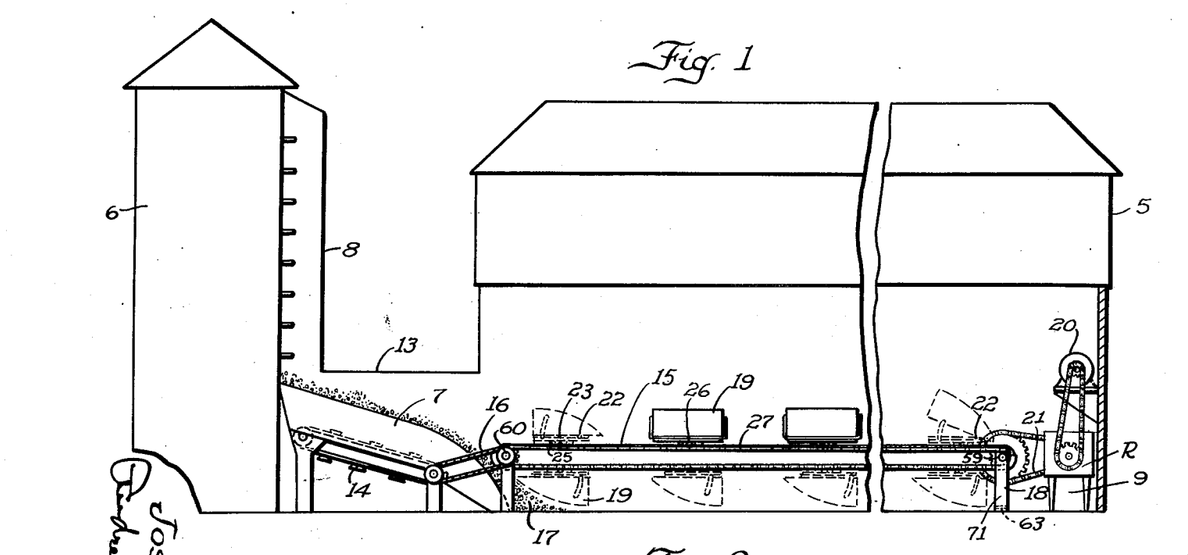
Fig. 1 is a view including a partial longitudinal section through a barn equipped with a feed platform and a conveying and dispensing apparatus in accordance with my invention.
Figure 2:
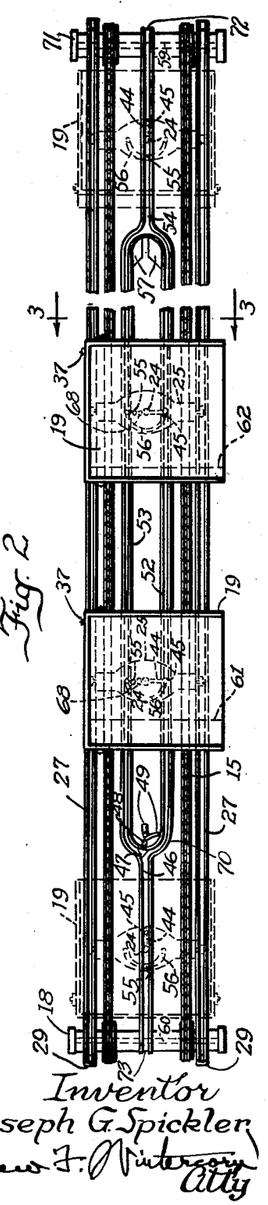
Fig. 2 is a plan view of said apparatus on a larger scale.

Referring to Fig. 1, the reference numeral 5 designates the barn and 6 the silo nearby. A feed platform 7 is provided in accordance with my invention below the chute 8 of the silo and extends to one end of the aisle 9 provided in the barn between the manger ends of two rows of stalls 10 and 11, for which stanchions are indicated at 12 in Fig. 3. These stanchions 12 are omitted in Figs. 1 and 2 to avoid confusion. The platform 7 will be enclosed, as indicated at 13, for protection from the weather. The ensilage from the silo comes down the chute 8 onto the platform 7 and an endless power-operated conveyor 14 that is driven with the endless chain type conveyor 15 through a chain and sprocket connection, indicated at 16, conveys the feed to a pile 17 under the outer end of the frame 18 of the conveyor 15 where the buckets 19 can easily be filled by scooping up the feed as the buckets pass from the lower flight of the conveyor 15 to the upper flight. The fact that the conveyor 14 is operated in unison with the conveyor 15 is important because this combination insures the piling of the feed at 17 substantially in proportion to the rate at which the buckets 19 will pick it up, and when the conveyor 15 stops, as hereinafter described, the conveyor 14 also stops. The conveyor 15, which provides upper and lower horizontal flights, one or both of which may carry buckets 19, is driven by an electric motor 20 through a reduction gear box R and thence through a chain and sprocket connection, indicated at 21.

Figures 3, 4:
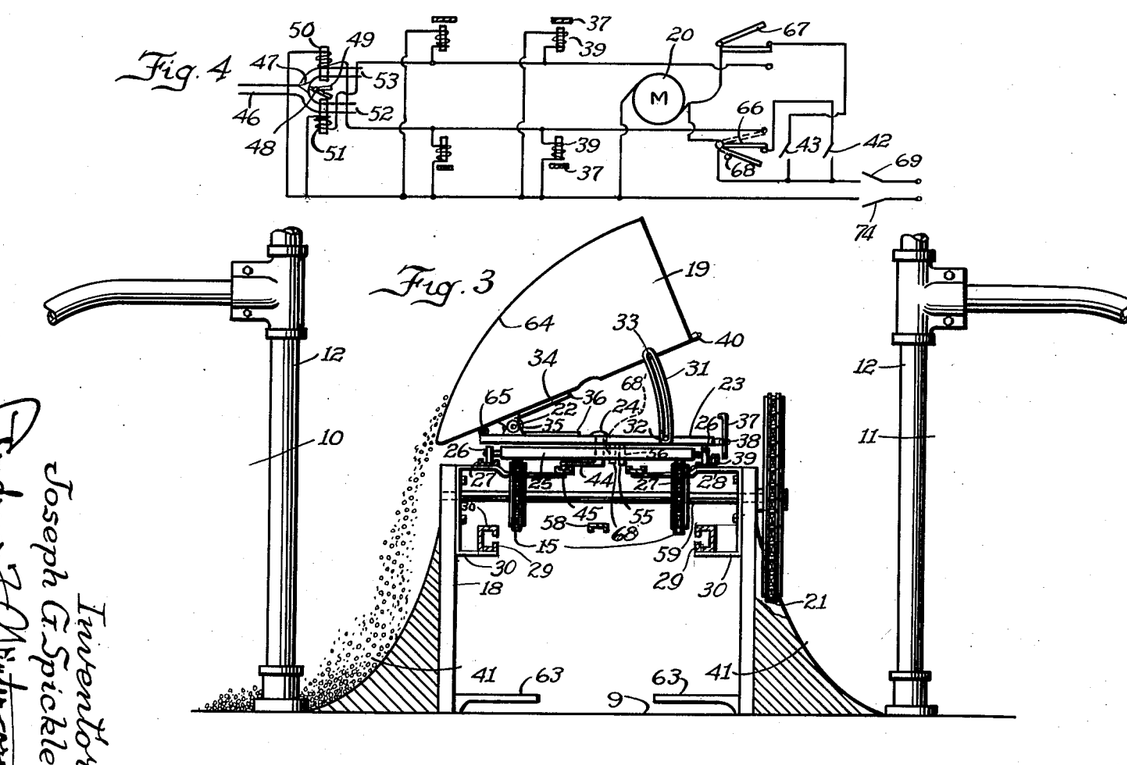
Fig. 3 is a cross-section through said apparatus approximately on line 3—3 of Fig. 2 on a larger scale and showing a bucket in released or dumping position and showing the driven shaft at one end of the frame.
Fig. 4 is an electric wiring diagram.
Figure 5:
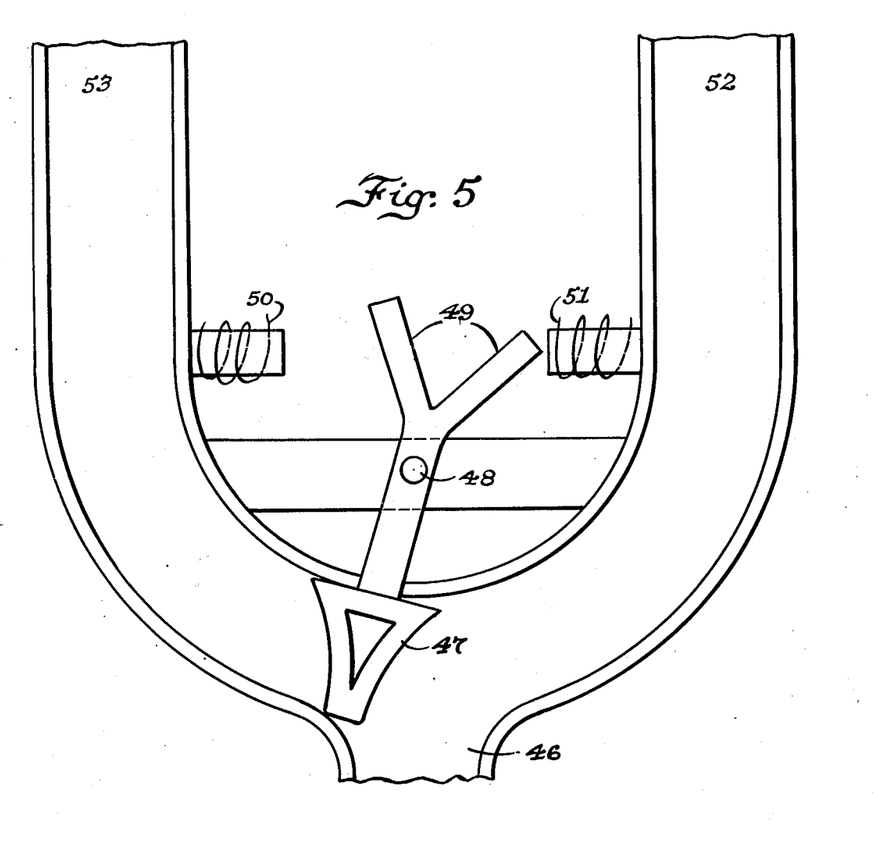
Fig. 5 is an enlarged plan view of the switch at the inlet or entering end of the branch tracks.

The buckets 19 are hinged under their front ends, as indicated at 22, on carrier frames 23 which in turn are swivelled, as indicated at 24, on supports 25 that are attached to the conveyor 15. The conveyor 15 serves merely to pull the buckets; the buckets are supported by rollers 26 provided on the ends of the supports 25 running in channel-shaped tracks 27 that extend lengthwise of the top of the frame 18 and are suitably supported on brackets 28, as shown in Fig. 3. Other channel-shaped tracks 29 extend lengthwise of the frame 18 below the tracks 27 and are suitably supported on brackets 30, these tracks receiving the rollers 26 for support of the empty buckets in their movement along the lower flight of the conveyor 15. There are slotted arcuate links 31 pivoted at 32 to the carrier frames 23 and receiving trunnions 33 that project from the opposite sides of the buckets 19 to limit the dumping movement of the buckets. Heavy grasshopper type torsion springs 34 which have their coiled portions 35 mounted on the hinge pins 22 and have their tangentially extending end portions 36 bearing against the carrier frames 23 and against the bottom of the buckets 19 serve to raise the buckets abruptly to the dumping position, shown in Fig. 3, when the latches 37 that are pivoted at 38 on the carrier frames 23 are actuated by solenoids 39 to retracted positions relative to projections 40 provided on the backs of the buckets. As will soon appear, the solenoids 39 are automatically energized when the conveyor 15 reaches a predetermined position for the dumping of the buckets at which time the motor 20 is stopped. When the conveyor 15 is stopped automatically by the projection 68 engaging one or the other of the two limit switches 66 and 67, the buckets 19 are disposed adjacent and facing the respective stalls 10 or 11, as the case may be, so that the feed will be dumped into the manger 41.

Figure 6:
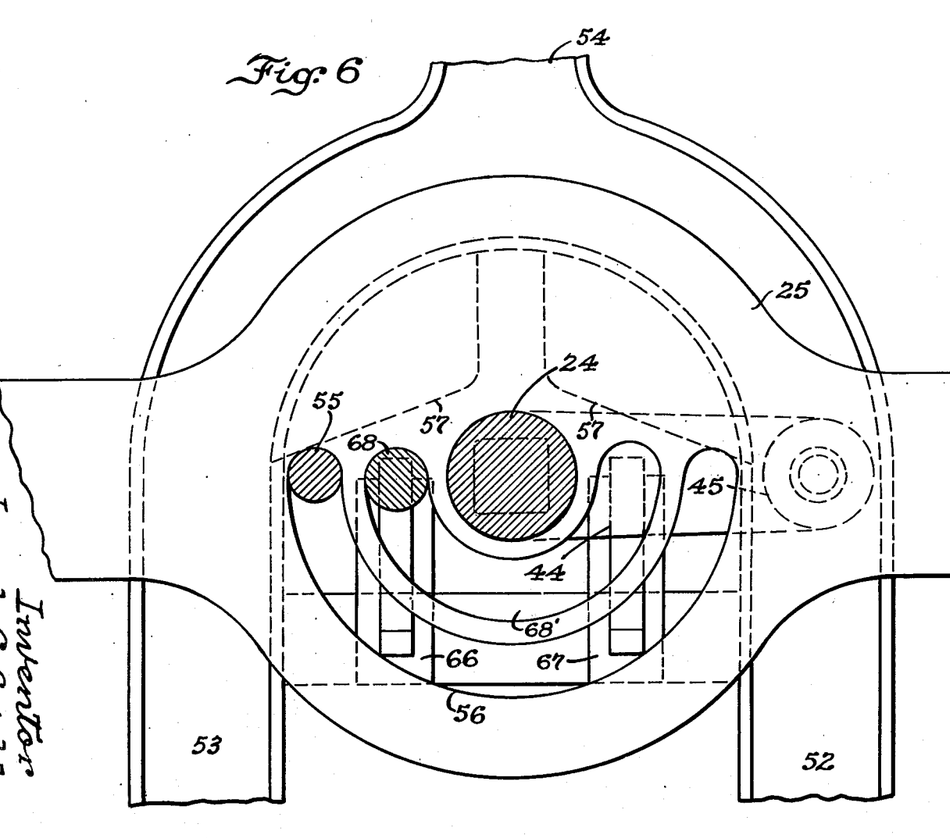
Fig. 6 is an enlarged plan view of the outgoing end of the same branch tracks, illustrating the support for the endmost bucket and the adjacent limit switches and bucket turning cams.
Figure 7:
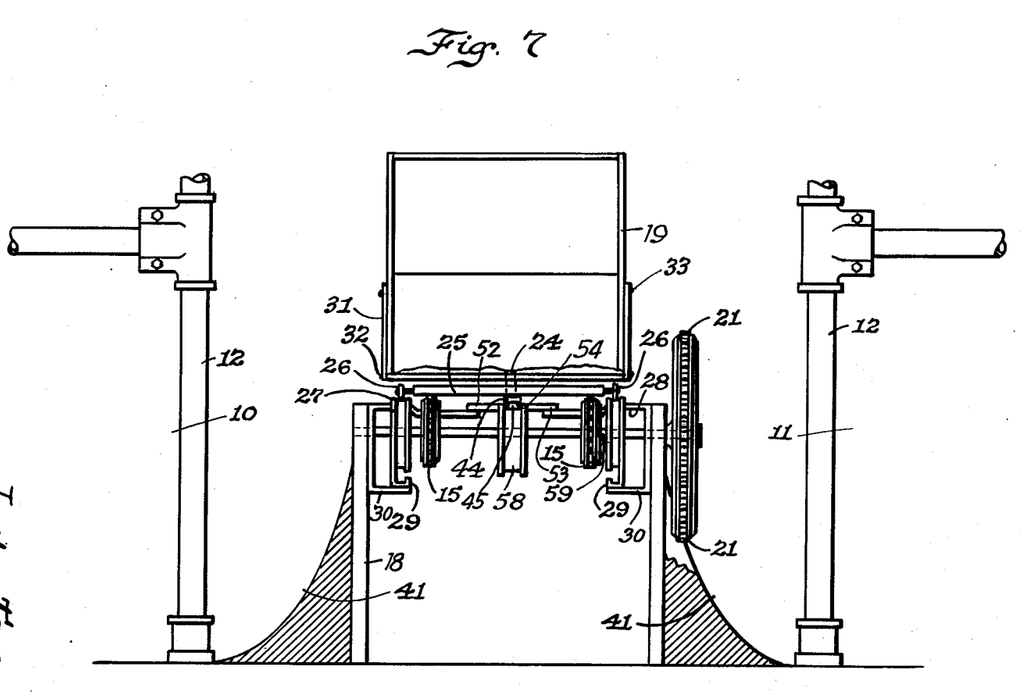
Fig. 7 is an end view of Fig. 2, taken from the right hand end, and showing the parts on the same scale as in Fig. 3.
Figure 8:
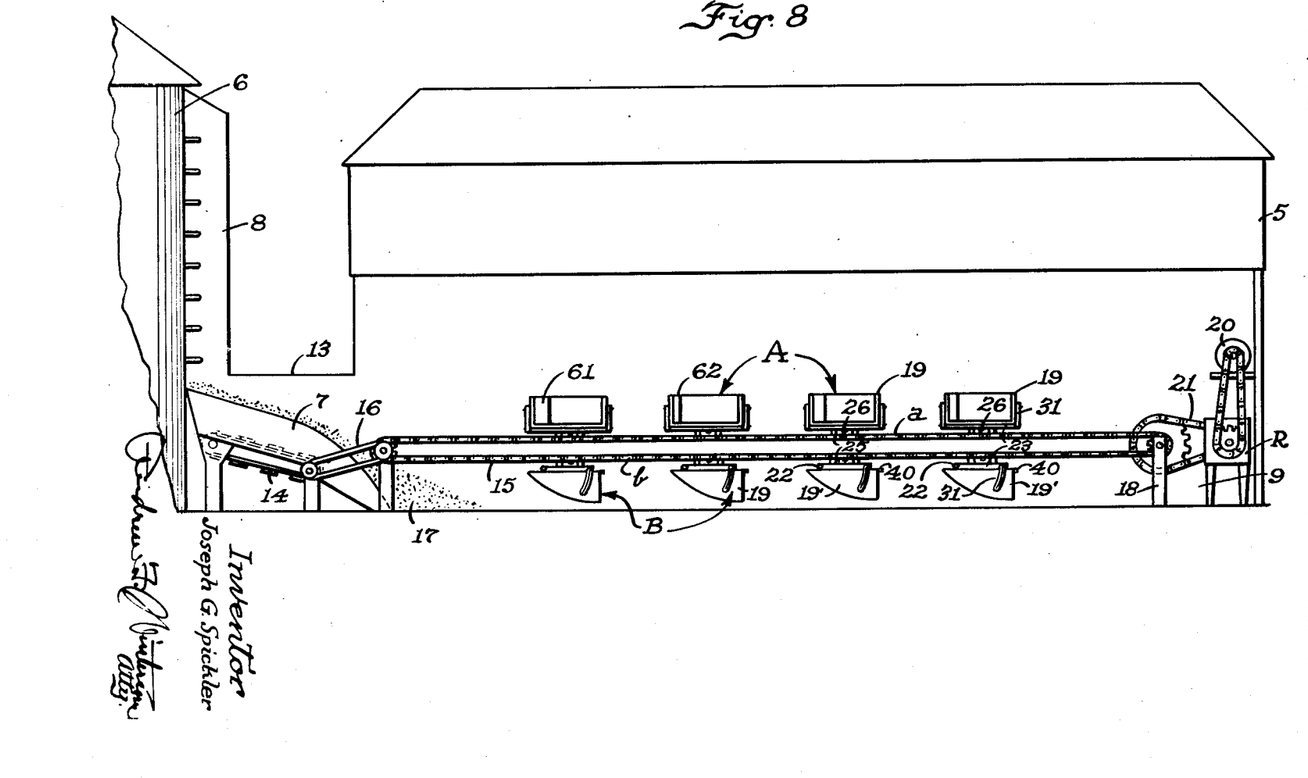
Fig. 8 is a side view of the apparatus similar to Fig. 1, but showing the use of two series of buckets, one of which series is intended for one row of stalls and is on the upper flight when the other series, intended for the other row of stalls, is on the lower flight.

The buckets 19 are arranged to be automatically turned on their pivots 24 to the right or left to dispense feed to stalls 10 or 11. There are two push button switches 42 and 43 (Fig. 4), the depression of either of which is arranged to start the motor 20 to move the conveyor 15 through a cycle of filling the buckets 19 and dumping the contents. As will soon appear, when the conveyor 15 has completed a cycle as a result of depression of switch 42, the conveyor can be put through the next cycle only by depression of switch 43, and vice versa. The pivots 24 for the buckets have cranks 44 rigid therewith on the outer ends of which are roller bearing crank pins 45 arranged to run in a channel-shaped track 46 extending lengthwise of the incoming end portion of the frame 18 and suitably supported on extensions of the brackets 28. A switch blade 47 pivotally mounted at 48 on the entrance end of the double-track structure 70 has a forked tail portion 49 cooperating with solenoids 50 and 51 to permit throwing the switch 47 to the left or right and accordingly direct the crank pin 45 to either of two branch tracks 52 and 53 that extend in parallel relation lengthwise of the frame 18 between the incoming track 46 and an outgoing track 54 that extends lengthwise of the other end portion 71 of the frame 18. The buckets 19 are turned to face the stalls 10 when the crank pins 45 are in the track 52, but they are turned the other way to face the stalls 11 when the crank pins 45 are in track 53. Pins 55 extending downwardly from the carrier frame 23 through arcuate slots 56 in the supports 25 are arranged to strike either one of two cams 57 that project slightly above the plane of the tracks 52 and 53 at the outgoing end, as best appears in Fig. 6, to turn the buckets in a clockwise or counterclockwise direction, as the case may be, by engagement with the pins 55, and move the crank pins 45 into the outgoing track 54 in leading relation to the pins 55. Ahe outgoing track 54 is connected by a downwardly curved portion 72 with another middle track 58 that extends lengthwise of the frame 18 midway between the tracks 29 to guide the crank pins 45 for straight-line movement the full length of the frame 18 back to the incoming track 46, the other end portion of the single track 58 being connected by an upwardly curved portion 73 with the single track 46 previously mentioned, the track 58 being connected at its ends 72 and 73 to the tracks 46 and 54 on arcs concentric with the shafts 59 and 60. In actual practice all of the buckets 19 will be disposed with their crank pins 45 in either of the branches 52 and 53 when the conveyor 15 stops for the dumping of the feed from the buckets, and that is the reason I have shown in full lines in Figs. 1 and 2 only those buckets which are disposed between the end track sections 46 and 54 and have shown the others in dotted lines. On the other hand, I may provide one set of buckets 19 for the stalls 10, marked A in Fig. 8, and another set of buckets 19' for the stalls 11, marked B in Fig. 8, the one set A being on the upper flight $a$ of the conveyor 15 while the other set B is on the lower flight $b$. An advantage obtained by such an arrangement is that then there is one individual bucket for each stall and the buckets may be made of different capacities or may have filler blocks like those indicated in dotted lines at 61 and 62 in Fig. 2 and in full lines in Fig. 8, fastened in one end or across the back on the inside of the buckets to change the capacity to suit the different cows to be fed, the so-called "heavy milkers" being given the larger portions. The buckets 19 after they have been dumped by electro-magnetic operation of their latches 37 have to be returned to their normal retracted positions and latched again before they can be refilled, and for that purpose I provide projecting brackets 63 on the lower portion of the outgoing end of the frame 18, the buckets 19 being cammed by sliding movement of their curved edge portions 64 over the bracket 63 as the buckets move downwardly and then inwardly in going from the upper flight to the lower flight of the conveyor 15. In this return movement and latching of the buckets, the springs 34 are loaded for the dumping operation later. If desired, strips of sound deadening material 65 may be attached to one end of the carrier frames 23 for engagement with the open end portions of the buckets 19 in the dumping thereof so that the operation will not be too noisy.

Referring to the wiring diagram in Fig. 4, there are two forked limit switches 66 and 67 which are normally held in the full line positions, but are arranged to be moved by a projection 68 on the support 25 of the first bucket of a plurality of buckets to the dotted line position indicated for switch 66, when the conveyor has been moved far enough to position all of the buckets in front of the appropriate stalls, whereby to break the circuit for the motor 20 to stop the conveyor 15 and at the same time complete the circuit through the solenoids 39 to release the latches 37 and dump the buckets and also energize the solenoid 50 to move the switch 47 to its other extreme. This is at the end of a cycle. Now, assuming, let us say, that the cycle was started by the closing of switch 42 and ended by the operation of switch 66 just described, the operator can by closing switch 43 start another cycle to convey and dispense feed to the other row of stalls by closing switch 43, the motor 20 in that event having its circuit completed through the switch 67 and continuing to operate until a projection 68 on the first of the other series of buckets or on the first of the same series of buckets, depending upon whether two series or one series of buckets is provided, as previously mentioned, operates the switch 67 to open the motor circuit and close the circuit through the related solenoids 39 and solenoid 51. The limit switches 66 and 67 may be of any conventional type which are normally in one position under spring pressure or action of gravity, as indicated in full lines in Fig. 4, but arranged to be moved by the projection 68 to the other extreme position for switch 66, indicated in dotted lines in Fig. 4, the projection 68 moving with the pivotal support 23 to operate the one switch 66 at the limit of movement when the buckets are facing in one direction, and to operate the switch 67 at the limit of movement when the buckets are facing in the other direction, the projection 68 on each bucket moving in an arcuate slot 68' provided therefor in the bar 25, similarly as in the case of pins 55 working in slots 56. The pins 68 being shorter than the pins 55 clear the tops of the cams 57 and do not interfere with the pins 55 riding on the inclined inner side face of one or the other of said cams. Assuming then that the cows in both rows of stalls have been fed, a main line switch 69 can now be opened so as to avoid useless power consumption and any possible fire hazard. Of course, thermally operated time delay type of automatic cut-out switches, like that indicated at 74 in Fig. 4, are commonly provided in such circuits to break the circuit automatically in the event the operator forgets to open the main switch 69.

In operation, to start the first cycle, the operator closes the main switch 69 and then presses button 42 to start the motor 20. The switch 47 having been left in the position shown in Fig. 4 as a result of the energization of the solenoid 51, will direct the buckets 19 to the right track 52 to dispense feed to the stalls 10. Then the first bucket of the plurality of buckets opens the switch 66 and breaks the circuit of motor 20 and at the same time closes the circuit for the one set of solenoids 39 that is connected in parallel with the solenoid 50, whereby to dump the buckets 19 and at the same time throw the switch 47 to the right, namely, adjacent solenoid 50. When the operator presses button 43, a new cycle is started through the switch 67 and the motor 20 operates to move the series of buckets 19 along the track 53 so as to dispense feed to the stalls 11. The switch 67 is operated by the projection 68 when the foremost bucket of the series reaches a predetermined position adjacent the endmost stall 11, in which all of the buckets are arranged in register with the associated stalls, thereby stopping the motor 20 and completing a circuit simultaneously through the solenoids 39 that are connected in parallel with the solenoid 51, whereby to dump the buckets 19 and at the same time throw the switch 47 back to the first position, namely, adjacent solenoid 50. The main switch 69 can then be opened inasmuch as the stalls in both rows have been serviced.

It is believed the foregoing description conveys a good understanding of the objects and advantages of my invention. The appended claims have been drawn to cover all legitimate modifications and adaptations.

I claim:

1. The combination with two spaced rows of stalls, of an elongated frame extending lengthwise of the space between the rows, an endless conveyor on said frame, buckets spaced lengthwise of and carried on said conveyor, supports for said buckets pivoted relative to the conveyor whereby said buckets are adapted to face toward either row of stalls, said supports having the buckets hinged thereto to dump their contents into said stalls, power means for operating said conveyor, means on the frame relative to which the conveyor is movable arranged to engage parts fixed relative to said supports to turn the buckets on the pivots, means for raising the buckets on their hinges relative to their supports to dump the contents, and means for delivering feed to the buckets.

2. The combination with a row of stalls, of an elongated frame extending lengthwise of the row, an endless conveyor on said frame, buckets spaced lengthwise of and carried on said conveyor, supports for said buckets pivoted relative to the conveyor whereby said buckets are adapted to be turned to face the stalls, said supports having the buckets hinged thereto to dump their contents into said stalls, power means for operating said conveyor, means on the frame relative to which the conveyor is movable arranged to engage parts fixed relative to said supports to turn the buckets on the pivots, means for raising the buckets on their hinges relative to their supports to dump the contents, and means for delivering feed to the buckets.

3. The combination with two spaced rows of stalls, of an elongated frame extending lengthwise of the space between the rows, an endless conveyor on said frame, buckets spaced lengthwise of and carried on said conveyor, supports for said buckets pivoted relative to the conveyor whereby said buckets are adapted to face toward either row of stalls, said supports having the buckets hinged thereto to dump their contents into said stalls, power means for operating said conveyor, means on the frame relative to which the conveyor is movable arranged to engage parts fixed relative to said supports to turn the buckets on the pivots, spring means normally tending to swing the buckets upwardly on their hinges relative to said supports to dump the contents, latch means releasably locking the buckets in lowered position relative to said supports, means for releasing the latch means when the buckets are disposed adjacent the stalls and turned to face the same, means on the frame slidably engageable by said buckets in the movement of the conveyor relative to the frame for mechanically returning the buckets to latched position, and means for delivering feed to the buckets.

4. The combination with a row of stalls, of an elongated frame extending lengthwise of the row, an endless conveyor on said frame, buckets spaced lengthwise of and carried on said conveyor, supports for said buckets pivoted relative to the conveyor whereby said buckets are adapted to be turned to face the stalls, said supports having the buckets hinged thereto to dump their contents into said stalls, power means for operating said conveyor, means on the frame relative to which the conveyor is movable arranged to engage parts fixed relative to said supports to turn the buckets on the pivots, spring means normally tending to swing the buckets upwardly on their hinges relative to said supports to dump the contents, latch means releasably locking the buckets in lowered position relative to said supports, means for releasing the latch means when the buckets are disposed adjacent the stalls and turned to face the same, means on the frame slidably engageable by said buckets in the movement of the conveyor relative to the frame for mechanically returning the buckets to latched position, and means for delivering feed to the buckets.

5. The combination with a row of stalls, of an elongated frame extending lengthwise of the row, an endless conveyor on said frame, buckets spaced lengthwise of and carried on said conveyor, supports for said buckets on said conveyor relative to which said buckets are hinged to dump the buckets' contents into said stalls, power means for operating said conveyor, means for raising the buckets on their hinges relative to the supports to dumping position, and means for delivering feed to the buckets.

6. The combination with a row of stalls, of an elongated frame extending lengthwise of the row, an endless conveyor on said frame, buckets spaced lengthwise of and carried on said conveyor, supports for said buckets on said conveyor relative to which said buckets are hinged to dump the buckets' contents into said stalls, power means for operating said conveyor, spring means normally tending to swing the buckets upwardly on their hinges relative to said supports to dump the contents, latch means releasably locking the buckets in lowered position relative to said supports, means for releasing the latch means when the buckets are disposed adjacent the stalls, means on the frame slidably engageable by said buckets in the movement of the conveyor relative to the frame for mechanically returning the buckets to latched position, and means for delivering feed to the buckets.

7. The combination with two spaced rows of stalls, of an elongated frame extending lengthwise of the space between the rows, an endless conveyor on said frame, buckets spaced lengthwise of and carried on said conveyor, supports for said buckets pivoted relative to the conveyor whereby said buckets are adapted to face toward either row of stalls, said supports having the buckets hinged thereto to dump their contents into said stalls, power means for operating said conveyor, a crank in rigid relationship to each support on the pivotal axis thereof adapted to turn the bucket toward either row of stalls, said cranks having pins projecting therefrom, a pair of spaced parallel guide tracks extending lengthwise of said frame on diametrically opposite sides of the pivotal axes of said buckets in either of which the pins on said cranks are adapted to slide when the buckets move with the upper flight of the conveyor, a single guide track extending lengthwise of the frame on the longitudinal center-line in which the pins are adapted to slide when the buckets move with the lower flight of the conveyor, said buckets facing all in one direction during the latter travel and being adapted to scoop up feed in the movement thereof with the conveyor from the lower flight to the upper flight at one end of said frame, the last mentioned guide track having extensions at the opposite ends of said frame connected with the opposite end portions of the first mentioned guide tracks, a mechanical switch means at the one junction of said guide tracks, the position of which determines the direction the buckets are turned as a result of the sliding of the crank pins into one or the other of the first mentioned pair of guide tracks, means for raising the buckets on their hinges relative to their supports to dump the contents, and means for delivering feed to a scoop-up station at one end of said frame.

8. The combination set forth in claim 7, wherein the means for raising the buckets on their hinges relative to the supports to dump the contents comprises spring means normally urging the buckets to a dumping position, the combination including latch means for releasably locking the buckets in retracted position relative to their supports, means to release the latch means when the buckets are disposed adjacent the stalls, and means on the frame slidably engageable by said buckets in the movement of the conveyor for mechanically returning the buckets to latched position.

9. The combination as set forth in claim 1, wherein the power means for operating said conveyor comprises an electric motor having an electrical circuit therefor including a manually operable switch for starting the motor, and other switch means in the circuit for automatically stopping the motor at the end of a cycle of movement of the conveyor.

10. The combination set forth in claim 2, wherein the power means for operating said conveyor comprises an electric motor having an electrical circuit therefor including a manually operable switch for starting the motor, and other switch means in the circuit for automatically stopping the motor at the end of a cycle of movement of the conveyor.

11. The combination set forth in claim 1, wherein the power means for operating said conveyor comprises an electric motor having an electrical circuit therefor including a manually operable switch for starting the motor, and other switch means in the circuit for automatically stopping the motor at the end of a cycle of movement of the conveyor, the means for raising the buckets to dumping position including electrical means, the circuits for which are interconnected with the motor circuit so as to be operative upon stoppage of the motor at the end of the cycle of movement of the conveyor.

12. The combination set forth in claim 2, wherein the power means for operating said conveyor comprises an electric motor having an electrical circuit therefor including a manually operable switch for starting the motor, and other switch means in the circuit for automatically stopping the motor at the end of a cycle of movement of the conveyor, the means for raising the buckets to dumping position including electrical means, the circuits for which are interconnected with the motor circuit so as to be operative upon stoppage of the motor at the end of the cycle of movement of the conveyor.

13. The combination set forth in claim 7, wherein the power means for operating said conveyor comprises an electric motor having an electrical circuit therefor including a manually operable switch for starting the motor, and other switch means in the circuit for automatically stopping the motor at the end of a cycle of movement of the conveyor.

14. The combination set forth in claim 7, wherein the power means for operating said conveyor comprises an electric motor having an electrical circuit therefor including a manually operable switch for starting the motor, and other switch means in the circuit for automatically stopping the motor at the end of a cycle of movement of the conveyor, the means for raising the buckets to dumping position including electrical means, the circuits for which are interconnected with the motor circuit so as to be operative upon stoppage of the motor at the end of the cycle of movement of the conveyor.

15. The combination set forth in claim 7, wherein the power means for operating said conveyor comprises an electric motor having an electrical circuit therefor including a manually operable switch for starting the motor, and other switch means in the circuit for automatically stopping the motor at the end of a cycle of movement of the conveyor, the combination including electrical means for operating the mechanical switch, said electrical means having the electrical circuit therefor connected with the motor circuit so as to operate the switch from one extreme position to the other upon stoppage of the motor at the end of the cycle of movement of the conveyor.

16. In combination, a barn containing two spaced rows of stalls for cattle, an elongated frame extending lengthwise of the space between the rows, an endless conveyor on said frame, buckets spaced lengthwise of and carried on said conveyor, supports for said buckets pivoted relative to the conveyor whereby said buckets are adapted to face toward either row of stalls, said supports having the buckets hinged thereto to dump their contents into said stalls, power means for operating said conveyor, means on the frame relative to which the conveyor is movable arranged to engage parts fixed relative to said supports to turn the buckets on the pivots, means for raising the buckets on their hinges relative to their supports to dump the contents, a silo containing ensilage, an ensilage conveyor extending from the silo to a scoop-up station at one end of said frame where the ensilage is piled so that the buckets will scoop it up in passing said station, and means connecting the ensilage conveyor with the bucket conveyor to run in unison.

17. In combination, a barn containing a row of stalls for cattle, an elongated frame extending lengthwise of the row, an endless conveyor on said frame, buckets spaced lengthwise of and carried on said conveyor, supports for said buckets pivoted relative to the conveyor whereby said buckets are adapted to be turned to face the stalls, said supports having the buckets hinged thereto to dump their contents into said stalls, power means for operating said conveyor, means on the frame relative to which conveyor is movable arranged to engage parts fixed relative to said supports to turn the buckets on the pivots, means for raising the buckets on their hinges relative to their supports to dump the contents, a silo containing ensilage, an ensilage conveyor extending from the silo to a scoop-up station at one end of said frame where the ensilage is piled so that the buckets will scoop it up in passing said station, and means connecting the ensilage conveyor with the bucket conveyor to run in unison.

18. In combination, a barn containing two spaced rows of stalls for cattle, an elongated frame extending lengthwise of the space between the rows, an endless conveyor on said frame, buckets spaced lengthwise of and carried on said conveyor, supports for said buckets pivoted relative to the conveyor whereby said buckets are adapted to face toward either row of stalls, said supports having the buckets hinged thereto to dump their contents into said stalls, power means for operating said conveyor, means on the frame relative to which the conveyor is movable arranged to engage parts fixed relative to said supports to turn the buckets on the pivots, spring means normally tending to swing the buckets upwardly on their hinges relative to said supports to dump the contents, latch means releasably locking the buckets in lowered position relative to said supports, means for releasing the latch means when the buckets are disposed adjacent the stalls and turned to face the same, means on the frame slidably engageable by said buckets in the movement of the conveyor relative to the frame for mechanically returning the buckets to latched position, a silo containing ensilage, an ensilage conveyor extending from the silo to a scoop-up station at one end of said frame where the ensilage is piled so that the buckets will scoop it up in passing said station, and means connecting the ensilage conveyor with the bucket conveyor to run in unison.

19. In combination, a barn containing a row of stalls for cattle, an elongated frame extending lengthwise of the row, an endless conveyor on said frame, buckets spaced lengthwise of and carried on said conveyor, supports for said buckets pivoted relative to the conveyor whereby said buckets are adapted to be turned to face the stalls, said supports having the buckets hinged thereto to dump their contents into said stalls, power means for operating said conveyor, means on the frame relative to which the conveyor is movable arranged to engage parts fixed relative to said supports to turn the buckets on the pivots, spring means normally tending to swing the buckets upwardly on their hinges relative to said supports to dump the contents, latch means releasably locking the buckets in lowered position relative to said supports, means for releasing the latch means when the buckets are disposed adjacent the stalls and turned to face the same, means on the frame slidably engageable by said buckets in the movement of the conveyor relative to the frame for mechanically returning the buckets to latched position, a silo containing ensilage, an ensilage conveyor extending from the silo to a scoop-up station at one end of said frame where the ensilage is piled so that the buckets will scoop it up in passing said station, and means connecting the ensilage conveyor with the bucket conveyor to run in unison.

20. The combination set forth in claim 1, wherein the buckets are in two series, the one series being on the upper flight when the other series is on the lower flight of said conveyor, and vice versa, the one series being arranged to face the one row of stalls including buckets individual to the stalls of that row, the capacities of the buckets being different to suit the feeding needs of animals known to occupy those stalls, and the remaining buckets being associated with the other row of stalls and including buckets individual to the stalls of that row, the capacities of the buckets being different to suit the feeding needs of animals known to occupy those stalls.

21. The combination set forth in claim 1, wherein the buckets are in two series, the one series being on the upper flight when the other series is on the lower flight of said conveyor, and vice versa, the one series being arranged to face the one row of stalls including buckets individual to the stalls of that row, the capacities of the buckets being different to suit the feeding needs of animals known to occupy those stalls, and the remaining buckets being associated with the other row of stalls and including buckets individual to the stalls of that row, the capacities of the buckets being different to suit the feeding needs of animals known to occupy those stalls, the buckets of both series being of substantially the same size but certain buckets having filler means therein to diminish the capacity thereof to suit the smaller feeding needs of the various animals.

22. The combination set forth in claim 16, wherein the buckets are in two series, the one series being on the upper flight when the other series is on the lower flight of said conveyor, and vice versa, the one series being arranged to face the one row of stalls including buckets individual to the stalls of that row, the capacities of the buckets being different to suit the feeding needs of animals known to occupy those stalls, and the remaining buckets being associated with the other row of stalls and including buckets individual to the stalls of that row, the capacities of the buckets being different to suit the feeding needs of animals known to occupy those stalls.

23. The combination set forth in claim 16, wherein the buckets are in two series, the one series being on the upper flight when the other series is on the lower flight of said conveyor, and vice versa, the one series being arranged to face the one row of stalls including buckets individual to the stalls of that row, the capacities of the buckets being different to suit the feeding needs of animals known to occupy those stalls, and the remaining buckets being associated with the other row of stalls and including buckets individual to the stalls of that row, the capacities of the buckets being different to suit the feeding needs of animals known to occupy those stalls, the buckets of both series being of substantially the same size but certain buckets having filler means therein to diminish the capacity thereof to suit the smaller feeding needs of the various animals.

24. The combination set forth in claim 1, wherein the series of buckets includes buckets individual to the several stalls, the capacities of the buckets being different to suit the feeding needs of animals known to occupy the stalls.

25. The combination set forth in claim 1, wherein the series of buckets includes buckets individual to the several stalls, the capacities of the buckets being different to suit the feeding needs of animals known to occupy the stalls, the buckets of both series being of substantially the same size but certain buckets having filler means therein to diminish the capacity thereof to suit the smaller feeding needs of the various animals.

JOSEPH G. SPICKLER.

REFERENCES CITED

The following references are of record in the file of this patent:

UNITED STATES PATENTS

| Number | Name | Date |
| --- | --- | --- |
| 1,186,444 | Schuchardt | June 6, 1916 |
| 2,092,440 | Cain | Sept. 7, 1937 |
| 2,344,596 | Carmina | Mar. 21, 1944 |